US011529962B2

(12) United States Patent
Toda et al.

(10) Patent No.: US 11,529,962 B2
(45) Date of Patent: Dec. 20, 2022

(54) AUTONOMOUS DRIVING ASSISTANCE SYSTEM AND OPERATION METHOD THEREFOR

(71) Applicant: Mitsubishi Electric Corporation, Tokyo (JP)

(72) Inventors: Taizo Toda, Tokyo (JP); Akio Numakura, Tokyo (JP); Jiro Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 130 days.

(21) Appl. No.: 17/051,025

(22) PCT Filed: Oct. 3, 2018

(86) PCT No.: PCT/JP2018/036981
§ 371 (c)(1),
(2) Date: Oct. 27, 2020

(87) PCT Pub. No.: WO2019/244366
PCT Pub. Date: Dec. 26, 2019

(65) Prior Publication Data
US 2021/0122384 A1    Apr. 29, 2021

(30) Foreign Application Priority Data

Jun. 20, 2018   (WO) .................. PCT/JP2018/023418

(51) Int. Cl.
*B60W 50/00*   (2006.01)
*B60W 50/029*  (2012.01)
(Continued)

(52) U.S. Cl.
CPC ...... *B60W 50/029* (2013.01); *B60W 50/0205* (2013.01); *B60W 50/045* (2013.01);
(Continued)

(58) Field of Classification Search
CPC ............... G05D 1/0088; G05D 1/0278; G05D 2201/0209; G05D 2201/0213;
(Continued)

(56) References Cited

U.S. PATENT DOCUMENTS

| | | | | |
|---|---|---|---|---|
| 8,396,655 | B2 * | 3/2013 | Breuer | ................... G08G 1/167 701/48 |
| 2008/0054716 | A1 | 3/2008 | Sato et al. | |
| 2019/0054919 | A1 | 2/2019 | Noto et al. | |

FOREIGN PATENT DOCUMENTS

| | | |
|---|---|---|
| JP | 2006-113654 A | 4/2006 |
| JP | 2008-055992 A | 3/2008 |

(Continued)

OTHER PUBLICATIONS

Communication dated Aug. 17, 2021 from the Japanese Patent Office in Application No. 2020-525220.

(Continued)

*Primary Examiner* — Ian Jen
(74) *Attorney, Agent, or Firm* — Sughrue Mion, PLLC; Richard C. Turner

(57) ABSTRACT

Provided is an autonomous driving assistance system for vehicles that has redundancy without posing any problem in diversity. The autonomous driving assistance system includes: a sensor configured to acquire surroundings information; a downstream device including an actuator configured to control a vehicle; and a driving assistance device configured to calculate a control amount for the downstream device on the basis of the surroundings information. The downstream device further includes a diagnosis unit configured to: perform comparison between at least two control amounts that include the control amount calculated in the driving assistance device and a control amount calculated in the downstream device on the basis of the surroundings information; and determine, if the control amounts are equal (Continued)

to each other, that the control amounts are normal, and determine, if the control amounts are different from each other, that the control amounts are abnormal.

20 Claims, 13 Drawing Sheets

(51) Int. Cl.
  *B60W 50/02* (2012.01)
  *B60W 50/04* (2006.01)
(52) U.S. Cl.
  CPC .............. *B60W 2050/021* (2013.01); *B60W 2050/0297* (2013.01)
(58) Field of Classification Search
  CPC .. G05D 1/0033; G05D 1/0274; G05D 1/0212; G05D 1/0061; G05D 1/0257; G05D 1/0217; G05D 1/024; G05D 1/0246; G05D 1/0276; G05D 1/0022; G05D 1/0027; G05D 1/0236; G05D 1/0238; G05D 1/0287; B60W 30/09; B60W 50/14; B60W 30/06; B60W 2554/00; B60W 2554/80; B60W 50/082; B60W 2540/18; B60W 30/0956; B60W 30/18163; B60W 2554/4041; B60W 2554/804; B60W 2556/50; B60W 2554/801; B60W 2710/18
  See application file for complete search history.

(56) References Cited

FOREIGN PATENT DOCUMENTS

| | | |
|---|---|---|
| JP | 2015-081013 A | 4/2015 |
| JP | 2015-093535 A | 5/2015 |
| JP | 2017-154542 A | 9/2017 |
| JP | 62-12409 B2 | 10/2017 |
| JP | 2018-052162 A | 4/2018 |

OTHER PUBLICATIONS

International Stage Entry of PCT/JP2018/036981 dated Jan. 15, 2019 [PCT/ISA/210].
Written Opinion of PCT/JP2018/036981 dated Jan. 15, 2019 [PCT/ISA/237].
Communication dated May 31, 2021, from the Intellectual Property of India in application No. 202027045740.

\* cited by examiner

AUTONOMOUS DRIVING ASSISTANCE SYSTEM AND OPERATION METHOD THEREFOR

CROSS REFERENCE TO RELATED APPLICATIONS

This application is a National Stage of International Application No. PCT/JP2018/036981 filed Oct. 3, 2018, claiming priority based on PCT application No. PCT/JP2018/023418 filed Jun. 20, 2018.

TECHNICAL FIELD

The present disclosure relates to an autonomous driving assistance system.

BACKGROUND ART

An autonomous driving assistance system for performing autonomous driving of a vehicle such as an automobile has employed the following measure to ensure safety during autonomous driving. That is, a plurality of autonomous driving devices for backup having the same function are provided in parallel, and the autonomous driving assistance system is configured to enable, even if an abnormality occurs in any of these devices, autonomous driving to be maintained by another normal device substituting for the abnormal device (see, for example, Patent Document 1).

Further, for a case where it is determined that autonomous driving should be ended, the following function is adopted in an autonomous driving assistance system in order to safely make switching to manual driving. That is, switching is made to manual driving only after: notification is given to the driver; and consent of the driver, or the like, is confirmed (see, for example, Patent Document 2).

CITATION LIST

Patent Document

Patent Document 1: Japanese Patent No. 6212409
Patent Document 2: Japanese Laid-Open Patent Publication No. 2017-154542

SUMMARY OF THE INVENTION

Problems to be Solved by the Invention

In these autonomous driving assistance systems, a driving assistance device for performing autonomous driving on the basis of information from a sensor includes three independent calculation devices which respectively calculate control amounts for a steering device, a drive device, and a brake device through substantially the same kind of computation. It is necessary for a comparison determination unit to determine whether these calculation results are normal or abnormal, and determine which of the calculation results is to be used for autonomous driving. Thus, a problem arises in that an enormous amount of very complex computation based on various kinds of input information is needed for calculating these control amounts. In addition, if calculation is performed through the same kind of computation by the same CPU, the same miscalculation may be repeated, and another problem arises from the viewpoint of diversification.

The present disclosure has been made to solve the above problems, and an object of the present disclosure is to obtain an autonomous driving assistance system that has redundancy and that is inexpensive and poses no problem in terms of diversification.

Solution to the Problems

An autonomous driving assistance system according to the present disclosure is an autonomous driving assistance system including: a sensor configured to acquire surroundings information; a downstream device including an actuator configured to control a vehicle; and a driving assistance device configured to calculate a control amount for the downstream device on the basis of the surroundings information. The downstream device further includes a diagnosis unit configured to: perform comparison between at least two control amounts that include the control amount calculated in the driving assistance device and a control amount calculated in the downstream device on the basis of the surroundings information; and determine, if the control amounts are equal to each other, that the control amounts are normal, and determine, if the control amounts are different from each other, that the control amounts are abnormal.

Effect of the Invention

The autonomous driving assistance system according to the present disclosure makes it possible to obtain an autonomous driving assistance system for vehicles that has redundancy and that is inexpensive and poses no problem in diversification.

DESCRIPTION OF EMBODIMENTS

Figure 1:
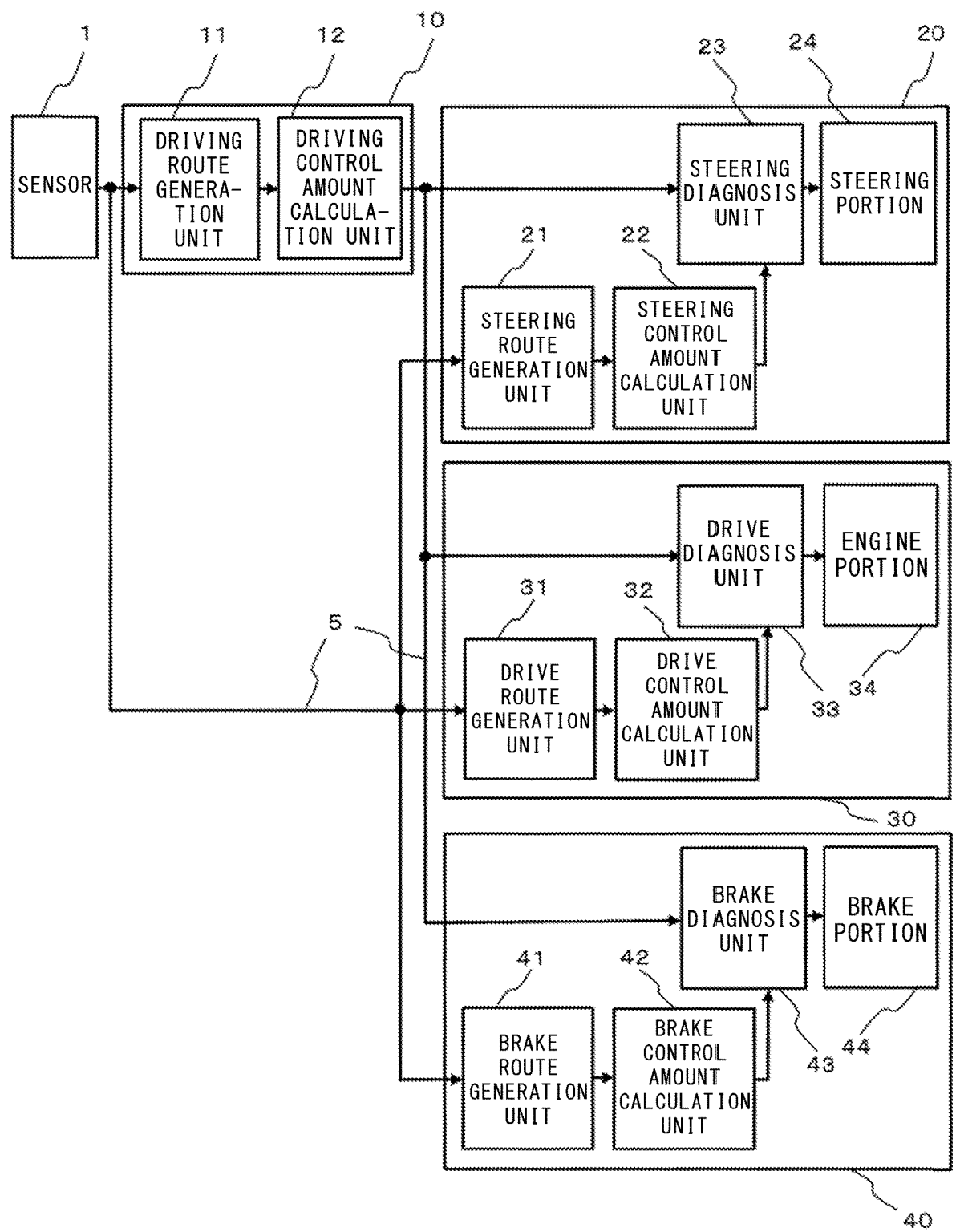
FIG. 1 is a block diagram of an autonomous driving assistance system according to embodiment 1.

In the description of embodiments and the drawings, parts denoted by the same reference characters indicate identical or corresponding parts.

Embodiment 1

Figure 2:
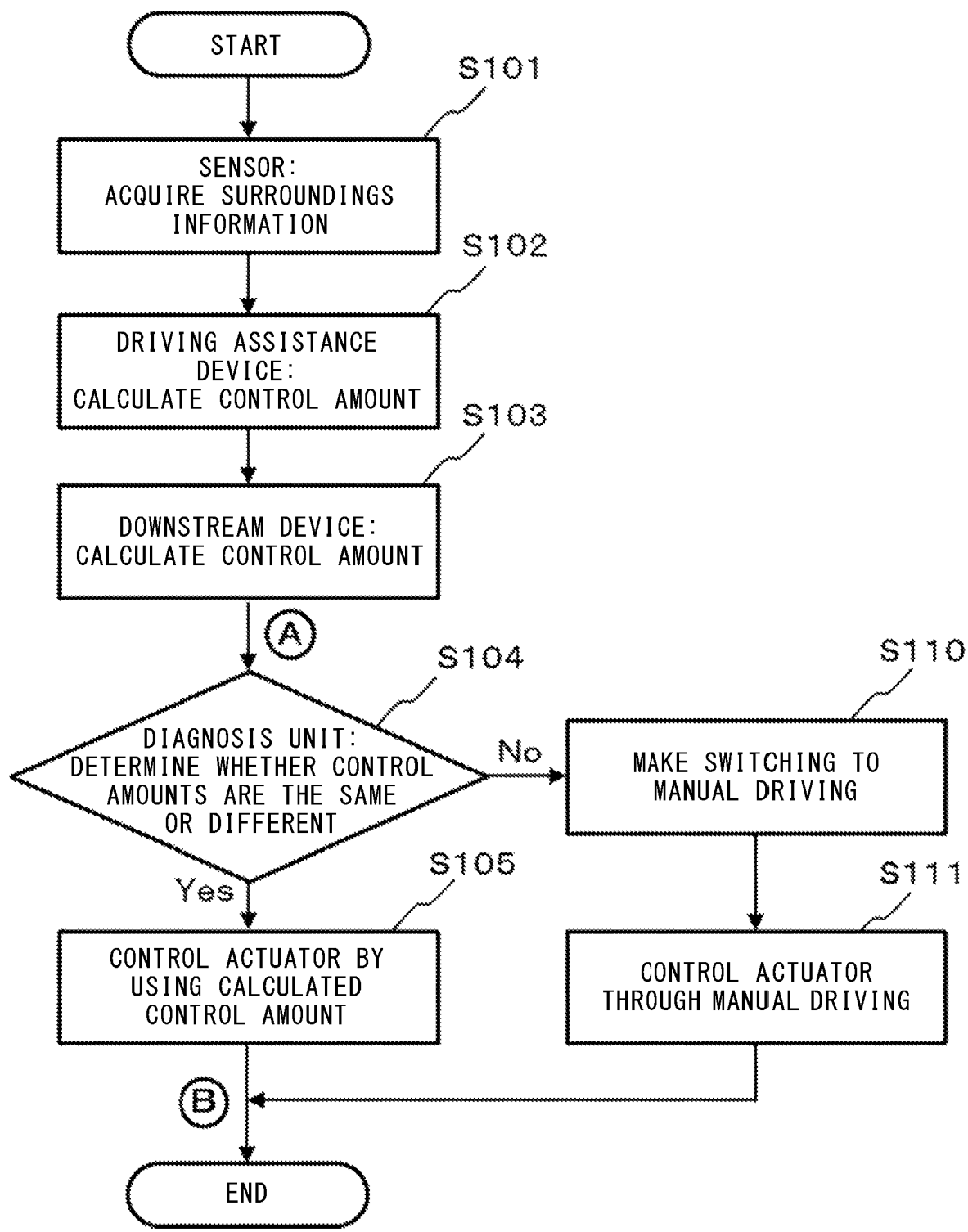
FIG. 2 is a flowchart for the autonomous driving assistance system according to embodiment 1.
Figure 3:
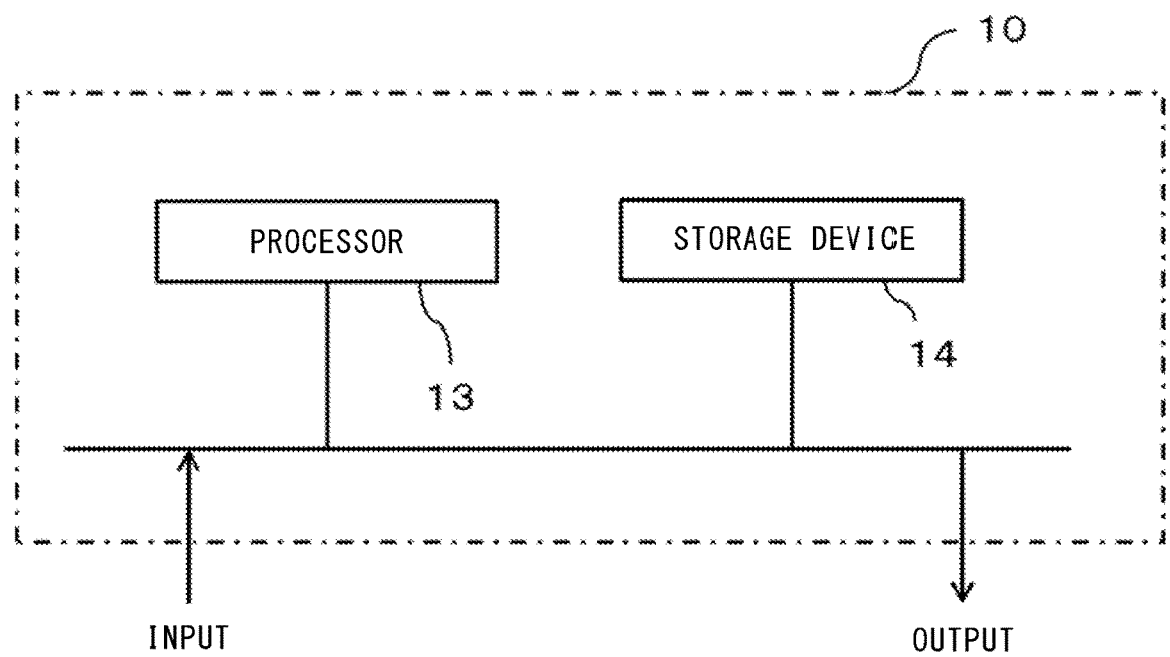
FIG. 3 is a hardware diagram of a driving assistance device in embodiment 1.

Embodiment 1 of the present disclosure will be described with reference to FIGS. 1 to 3. FIG. 1 is a block diagram of an autonomous driving assistance system and shows the entire configuration of the autonomous driving assistance system according to embodiment 1. FIG. 2 is a flowchart for the autonomous driving assistance system and shows an operation and drive procedure for the autonomous driving assistance system according to embodiment 1. FIG. 3 is a hardware diagram and shows, in the present embodiment, an example of hardware in which control amounts which are commands for actuators are calculated in a driving assistance device and downstream devices.

<Configuration of Autonomous Driving Assistance System>

FIG. 1 is a diagram of the entire configuration of the autonomous driving assistance system. The autonomous driving assistance system is composed mainly of: sensors 1; a driving assistance device 10; and a steering device 20, a drive device 30, and a brake device 40 which are actuators for actually controlling a vehicle. The steering device 20, the drive device 30, and the brake device 40 are sometimes referred to as downstream devices in the sense that they compose the latter half of the inside of the autonomous driving assistance system.

The sensors 1 are implemented by: cameras and radars for monitoring areas in front of, behind, and lateral to the vehicle; a navigator for road information data; and the like.

The driving assistance device 10 includes: a driving route generation unit 11 which generates a driving route on the basis of surroundings information acquired by the sensors 1; and a driving control amount calculation unit 12 which calculates, in order to apply the generated driving route, control amounts which are commands for the respective downstream devices.

Subsequently to the driving assistance device 10, the steering device 20, the drive device 30, and the brake device 40 which are three types of downstream devices are formed. These downstream devices are different from one another in vehicle-controlling function but have basically the same configuration. Thus, a structure will be described based on the steering device 20.

The steering device 20 includes: a steering route generation unit 21 and a steering control amount calculation unit 22 for calculating a control amount on the basis of the surroundings information from the sensors 1; and a steering diagnosis unit 23 which compares this control amount with the control amount calculated in the driving assistance device 10. Whether these control amounts are normal or abnormal is determined. If these control amounts are normal, the said control amount is outputted to an actuator that implements a steering portion.

As described above, the autonomous driving assistance system is composed of the sensors 1, the driving assistance device 10, and the steering device 20, the drive device 30, and the brake device 40 which are three types of downstream devices.

<Operation and Drive Procedure for Autonomous Driving Assistance System>

Next, an operation and drive procedure for the autonomous driving assistance system will be described with reference to the flowchart for the autonomous driving assistance system shown in FIG. 2.

In FIG. 2, a flow of autonomous driving assistance is shown from the upper side to the lower side. The steps from A to B shown in the flowchart are steps of determination by the diagnosis unit and control of the actuator based on the determination, which are parts of the flow of autonomous driving assistance. In the other embodiments, examples in which the steps from A to B are replaced by other steps will be described.

First, surroundings information is acquired by the sensors 1 (step S101), the surroundings information is outputted to the driving assistance device 10, and control amounts for controlling the actuators are calculated (step S102). As described with reference to FIG. 1, the driving assistance device 10 includes the driving route generation unit 11 and the driving control amount calculation unit 12. The driving route generation unit 11 selects information that is necessary for executing autonomous driving from, for example, information transmitted from the sensors 1 about the distance to a vehicle running in front, a traffic lane and an obstacle having been detected, the curvature of the road, a tunnel, and traffic congestion, and generates a driving route. Besides the above-described information, vehicle running information such as the vehicle speed, steering wheel steering, and a brake operation is also transmitted through the sensors 1 to the driving route generation unit 11 and used for generating a route.

In the driving control amount calculation unit 12, control amounts for the actuators composing the respective downstream devices are calculated on the basis of the driving route generated by the driving route generation unit 11, and are outputted.

Then, also in the downstream devices, control amounts are calculated on the basis of the surroundings information (step S103). There are three types of downstream devices, i.e., the steering device 20, the drive device 30, and the brake device 40, and a control amount is calculated in each of the downstream devices.

Specifically, the steering device 20 includes: the steering route generation unit 21 which acquires the surroundings information from the sensors 1 and information that is characteristic of the steering device 20 such as a steering wheel torque signal and steering wheel angle information, and selects and processes necessary information; and the steering control amount calculation unit 22 which calculates a control amount.

The information from the sensors 1 is transmitted to the drive device 30, and the drive device 30 acquires information that is characteristic of the drive device 30 and that is related to the rotation rate, the temperature, the drive shift position, and the like of the engine or a motor. A drive route generation unit 31 selects and processes drive-related information, and a drive control amount calculation unit 32 calculates a control amount.

The information from the sensors 1 is transmitted also to the brake device 40, a brake route generation unit 41 selects and processes brake-related information, and a brake control amount calculation unit 42 calculates a control amount.

In each of diagnosis units 23, 33, and 43, the corresponding control amount calculated in the driving assistance device 10 and the control amount obtained in the downstream device are compared with each other, and whether or not the control amounts are equal to each other is determined (step S104).

If these control amounts are different from each other, switching is made to manual driving (step S110), and the actuator is controlled through manual driving (step S111).

Meanwhile, if the diagnosis unit determines that these control amounts are the same control amount, the said control amount is used to control the actuator (step S105), and autonomous driving can be performed.

In control of the actuators through these steps of autonomous driving, a steering command is outputted to the steering device 20, an acceleration/deceleration command is outputted to the drive device 30, and a brake command is outputted to the brake device 40, thereby performing operation for steering, the engine or the motor, and the brake, respectively. As a more specific example, if the distance to a vehicle running in front is long, an engine portion 34 is controlled by giving an acceleration command to the drive device 30. Further, a steering portion 24 is controlled by giving a steering command to the steering device 20 according to the tilt and the curvature of the road in order to move the vehicle toward an edge of the road. Meanwhile, if the speed is excessively high, a brake portion 44 is controlled by giving a command for braking wheels to the brake device 40 in order to avoid the risk of running off the road.

<Hardware Configuration of Driving Assistance Device>

Hardware of each of the calculation units included in the driving assistance device 10, and the downstream devices 20, 30, and 40 composing the autonomous driving assistance system is composed of a processor 13 and a storage device 14, an example of the hardware being shown in FIG. 3. Although not shown, the storage device includes a volatile storage device such as a random access memory and a nonvolatile auxiliary storage device such as a flash memory. Alternatively, the storage device may include, instead of a flash memory, a hard disk as the auxiliary storage device. The processor 13 executes a program inputted from the storage device 14. In this case, a program is inputted from the auxiliary storage device via the volatile storage device to the processor 13. In addition, the processor 13 may output data such as a calculation result to the volatile storage device of the storage device 14, or save the data via the volatile storage device into the auxiliary storage device.

<Advantageous Effects of Autonomous Driving Assistance System>

Driving assistance devices 10 are devices for outputting a command of changing the behavior of a vehicle on the basis of various kinds of information, and do not directly control actuators that actually drive the vehicle. However, the contents of the command from the driving assistance devices 10 are considered to be most important in terms of safety.

If an abnormality occurs in generation of a route or calculation of a control amount in the driving assistance devices 10, an accident may be caused. In view of this, in the autonomous driving assistance system according to the present embodiment, the steering device 20, the drive device 30, and the brake device 40 which are the downstream devices of the autonomous driving assistance system and which are for operating the actuators also share the role of driving assistance regarding the respective operation targets in order to improve the safety of the driving assistance device 10 and ensure high redundancy and diversity for the autonomous driving assistance system.

For example, regarding the steering device 20 for controlling the steering portion 24, configuring is performed such that the information from the sensors 1 is transmitted not only to the driving assistance device 10 but also to the steering device 20 through a communication line 5. When having received the information from the sensors 1, the steering route generation unit 21 generates a route related to steering, and the steering control amount calculation unit 22 calculates a control amount to be transmitted to the steering portion 24. In other words, a part of control of the steering device 20 taken charge of by the driving assistance device 10 is assigned to the steering device 20, and calculation is performed parallelly.

The steering route generation unit 21 further acquires other information that is characteristic of the steering device 20, e.g., a steering wheel torque signal, a steering wheel angle information, and the like, selects or processes information related to steering, and outputs the information to the steering control amount calculation unit 22, and the steering control amount calculation unit 22 calculates a control amount.

Then, the steering control amount calculated in the driving assistance device 10 and the steering control amount calculated in the steering device 20 are compared with each other by the steering diagnosis unit 23. If both steering control amounts are the same calculation result, the said calculation result can be determined to be normal, and the steering portion 24 is driven on the basis of the said calculation result.

Similarly, the drive device 30 and the brake device 40 also parallelly perform parts of the function of the driving assistance device 10.

For example, in the drive device 30, a drive control amount calculated in the driving assistance device 10 and a drive control amount calculated in the drive device 30 are compared with each other by the drive diagnosis unit 33. If both drive control amounts are the same calculation result, the said calculation result is determined to be normal, and the engine portion 34 is controlled. This autonomous driving assistance system corresponds to a device called an EMS (engine management system). Even when the driver has not manipulated the accelerator, the EMS can cause the vehicle to run while controlling acceleration/deceleration.

In the brake device 40, a brake control amount calculated in the driving assistance device 10 and a brake control amount calculated in the brake device 40 are compared with each other by the brake diagnosis unit 43. If both brake control amounts are the same calculation result, the said calculation result is determined to be normal, and the brake portion 44 is controlled. The autonomous driving assistance system corresponds to a device called an ABS (antilock brake system). The ABS can give not only a brake command to cause braking to obtain a predetermined deceleration but also a fine brake command according to a vehicle running state without causing the vehicle to spin, such as a command to cause braking only at the outer front wheel during cornering at an excessive speed.

As described above, parallelly to calculation of the control amounts by the driving assistance device 10, parts of calculation of control amounts are assigned also to the steering device 20, the drive device 30, and the brake device 40 which control the respective actuators. Since the control amount obtained in the driving assistance device 10 and the control amount calculated in each downstream device are control amounts calculated by using different CPUs, an autonomous driving assistance system having excellent redundancy can be obtained.

In addition, it is also possible to integrally control the entire vehicle by comprehensively controlling steering, the engine, and the brake. A system for this control is called a VDC (vehicle dynamics control) system.

No calculation capabilities are newly imparted to the downstream devices in order to obtain the autonomous driving assistance system according to the present embodiment. Each downstream device is originally mounted with a CPU or the like for controlling the corresponding actuator, and thus has a capability of performing calculation. Therefore, there is no need to increase cost for the downstream devices to parallelly perform calculation, and thus the autonomous driving assistance system according to the present embodiment can be obtained at low cost.

Embodiment 2

Figure 4:
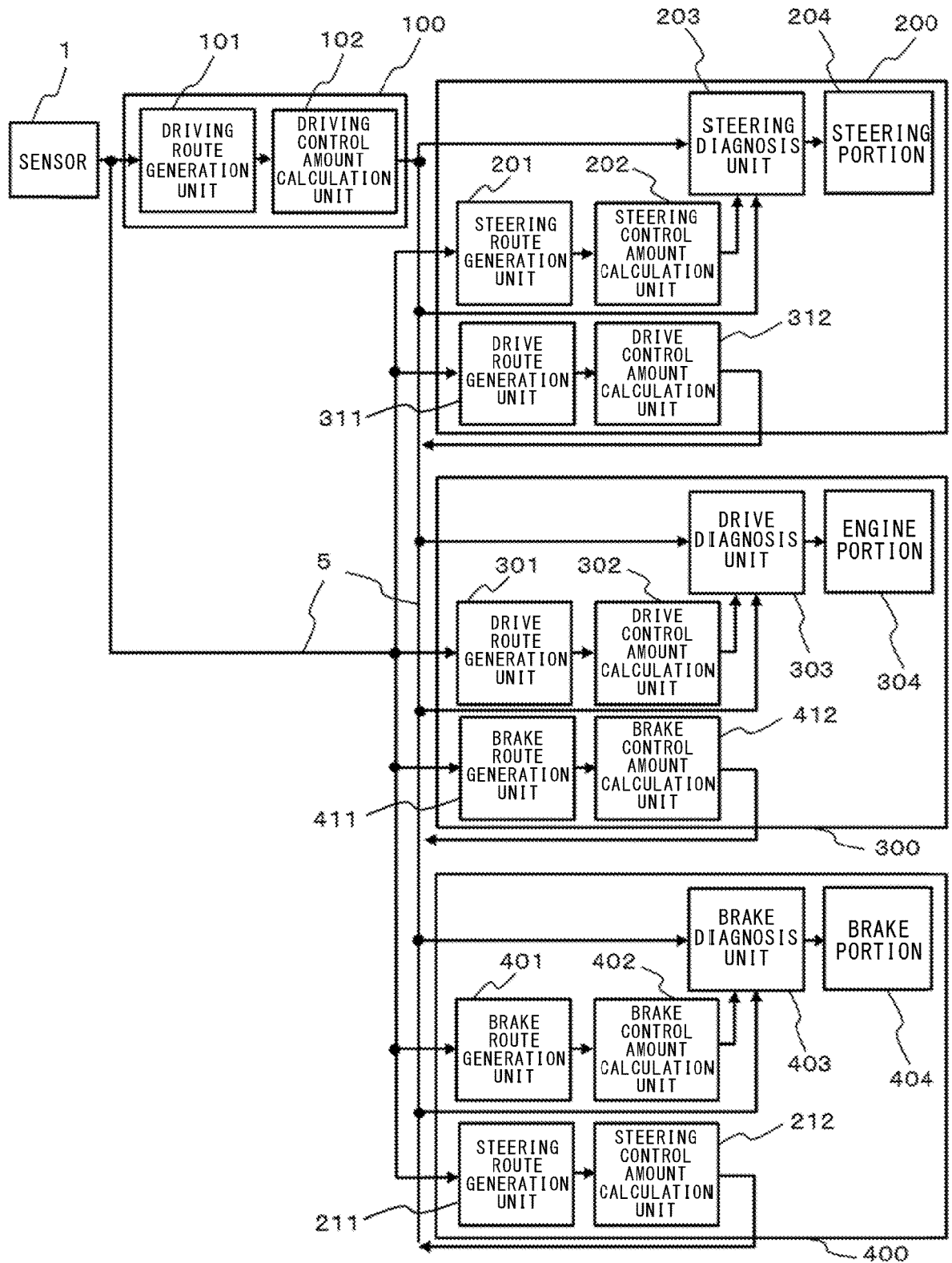
FIG. 4 is a block diagram of an autonomous driving assistance system according to embodiment 2.

Embodiment 2 will be described with reference to FIG. 4 and FIG. 5. The present embodiment is the same as embodiment 1 in that each downstream device parallelly performs a part of calculation of control amounts to be performed by a driving assistance device 100, thereby improving redundancy. Meanwhile, the present embodiment is different from embodiment 1 in that control amounts are parallelly calculated in the plurality of downstream devices, thereby further improving redundancy.

Figure 5:
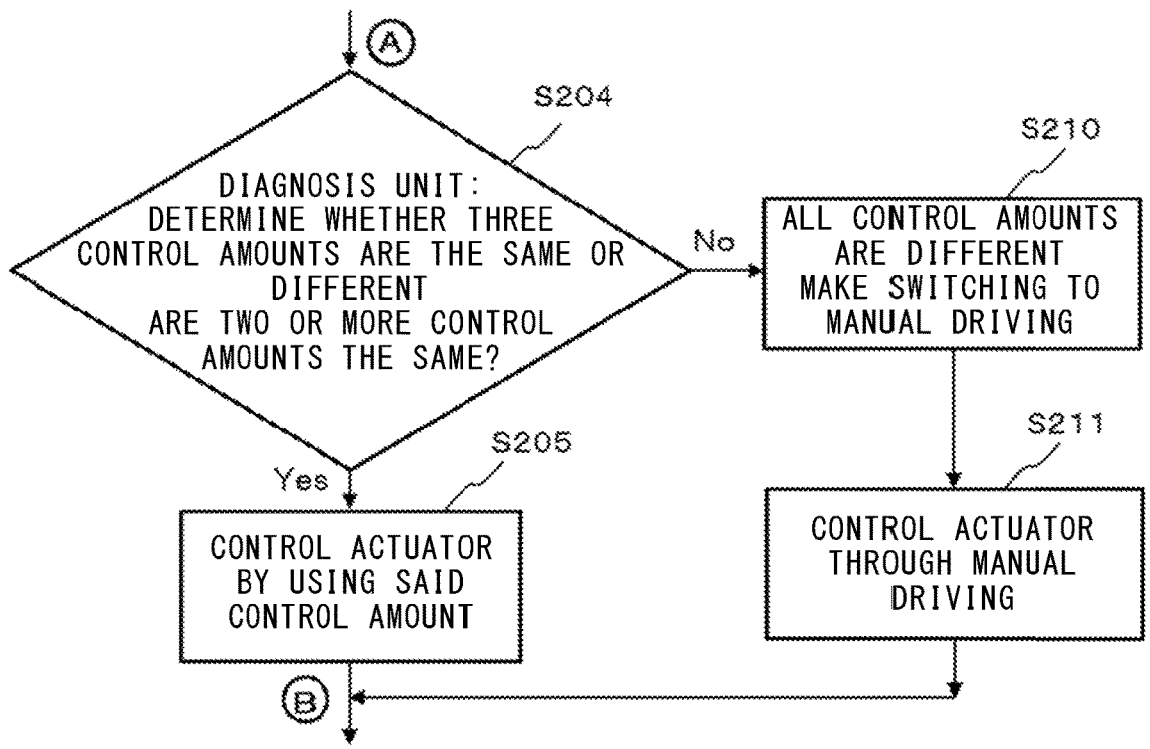
FIG. 5 is a part of a flowchart for the autonomous driving assistance system according to embodiment 2.

FIG. 5 is a flowchart for an autonomous driving assistance system according to the present embodiment, and shows only steps from A to B which are different from those in the flowchart for the autonomous driving assistance system according to embodiment 1 shown in FIG. 2. The hardware configuration is basically the same as that shown in FIG. 3, and thus description thereof is omitted.

In the present embodiment, a driving route generation unit 101, a steering route generation unit 201, a drive route generation unit 301, and a brake route generation unit 401 which generate routes can select and process the same information with the same accuracy. Alternatively, the accuracies of some of the route generation units may be reduced, or only some of the route generation units may be used, to calculate basic control amounts. Further, the simplified calculation makes it also possible for a pair of route generation units and a pair of control amount calculation units to simultaneously calculate two types of routes and two types of control amounts.

Timings of acquisition of various information from the sensors 1 may be different among the downstream devices, and, if there is a difference in the acquired information, it is considered that: errors are generated; and calculation results of a plurality of control amounts do not take the same value. In view of this, it is effective that, in each diagnosis unit: a margin is set for a determination criterion; and control amounts that fall within the predetermined range are regarded as the same and determined to be normal.

The present embodiment takes advantage of a feature of being able to calculate, in each downstream device, not only a route and a control amount for the own device but also a route and a control amount for another downstream device. Accordingly, an autonomous driving assistance system having further improved redundancy is achieved.

A configuration of each downstream device will be described using a configuration diagram that is explained in the present embodiment shown in FIG. 4.

Surroundings information is transmitted from the sensors 1 through the communication line 5 to a steering device 200, and a control amount for a steering portion 204 is calculated by the steering route generation unit 201 and a steering control amount calculation unit 202 and transmitted to a steering diagnosis unit 203.

At the same time, a control amount for an engine portion 304 is calculated by a drive route generation unit 311 and a drive control amount calculation unit 312 in the same steering device 200, and the control amount is transmitted through the communication line 5.

In a drive device 300, a control amount for the engine portion 304 is calculated by the drive route generation unit 301 and a drive control amount calculation unit 302 and transmitted to a drive diagnosis unit 303, and a control amount for a brake portion 404 is parallelly calculated by a brake route generation unit 411 and a brake control amount calculation unit 412 and transmitted through the communication line 5. Further, in a brake device 400, a control amount for the brake portion 404 is calculated by the brake route generation unit 401 and a brake control amount calculation unit 402 and transmitted to a brake diagnosis unit 403, and a control amount for the steering portion 204 is parallelly calculated by a steering route generation unit 211 and a steering control amount calculation unit 212 and transmitted through the communication line 5.

In addition to the steering control amount obtained in the steering device 200, the steering control amount calculated in the brake device 400 is transmitted through the communication line 5 to the steering diagnosis unit 203 of the steering device 200. Further, a calculation result from a driving control amount calculation unit 102 is added. Thus, the three calculation results are compared with one another.

Similarly, the two drive control amounts and a calculation result from the driving control amount calculation unit 102 are transmitted to the drive diagnosis unit 303, and the three calculation results are compared with one another. In addition, the two brake control amounts and a calculation result from the driving control amount calculation unit 102 are transmitted also to the brake diagnosis unit 403, and the three calculation results are compared with one another.

As described above, in the present embodiment, each diagnosis unit performs determination on the basis of a total of three calculation results, i.e., the calculation result from the driving assistance device 100 and the calculation results from the two downstream devices. Since all of these calculation results are calculated by different CPUs, more accurate determination can be performed, and false determination can be inhibited.

In the present embodiment, determination using the three calculation results will be described with reference to the flowchart shown in FIG. 5. In the flowchart, the steps from A to B of the flowchart shown in FIG. 2 have been taken out and replaced by steps in the present embodiment, and the steps other than the steps from A to B are the same as those in the flowchart in FIG. 2.

Whether or not two or more calculation results among the three calculated control amounts are the same control amount is determined (step S204). If two or more control amounts are the same control amount, the said control amount is used to control the actuator (step S205). If two or more control amounts do not take the same value, i.e., if all of the three control amounts are different from one another, switching is made to manual driving (step S210), and the actuator is controlled through manual driving (step S211).

In the present embodiment, since three control amounts are used, the redundancy is high, and accurate determination can be performed.

In the present embodiment, an example has been described in which: a steering control amount and a drive control amount are calculated in the steering device 200; a drive control amount and a brake control amount are calculated in the drive device 300; and a brake control amount and a steering control amount are calculated in the brake device 400. However, these combinations are just an example, and the same advantageous effects can be obtained also with different combinations for calculation. In addition, although an example in which two types of control amounts are calculated in each downstream device has been described, favorable effects can be obtained also if three types of control amounts are calculated in each downstream device.

In a case where, for example, two CPUs are mounted in each of the three downstream devices, two control amounts calculated by the two CPUs in the same downstream device can be used to perform diagnosis as to the validity of the calculation results. In order to improve redundancy, it is important to use calculation results obtained by different CPUs. Thus, it is possible to perform diagnosis by using, instead of a calculation result from another downstream device, calculation results obtained by two CPUs in the same downstream device.

Embodiment 3

Figure 6:
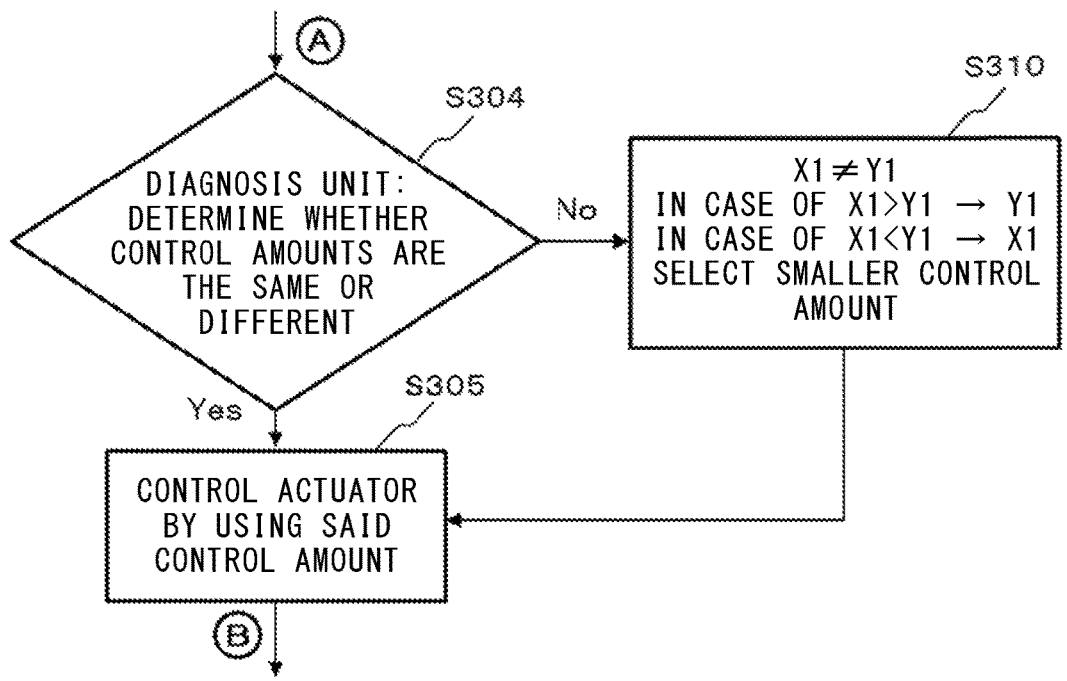
FIG. 6 is a part of a flowchart for an autonomous driving assistance system according to embodiment 3.

In the present embodiment, a measure against the case where a control amount calculated in the driving assistance device 10 and a control amount obtained in a downstream device such as the steering device 20, 200 are determined to be different from each other by the diagnosis unit, will be described with reference to the flowchart shown in FIG. 6.

In the flowchart, the steps from A to B of the flowchart shown in FIG. 2 have been replaced by steps in the present embodiment, and the steps other than the steps from A to B are the same as those of the flowchart in FIG. 2.

In a case where the control amount calculated in the driving assistance device 10 and the control amount calculated in the downstream device are the same control amount as a result of comparison therebetween (step S304), the said control amount is used to control the actuator (step S305).

Meanwhile, in a case where the control amounts are different from each other, it is necessary to select one of the control amounts that is safer in terms of the behavior of the vehicle. Here, a smaller control amount indicates a smaller control amount for the actuator and is considered to result in a smaller change. Thus, a control amount X1 calculated in the driving assistance device 10 and a control amount Y1 calculated in the downstream device are compared with each other, and, for example, the actuator is controlled by using Y1 as the control amount in the case of X1>Y1 while using X1 as the control amount in the case of X1<Y1 (step S310).

It is considered that, if a control amount that makes a smaller change to the actuator is used, the selected control amount causes a smaller change in the behavior of the vehicle and leads to better safety. Accordingly, a favorable autonomous driving assistance system can be obtained.

Embodiment 4

Figure 7:
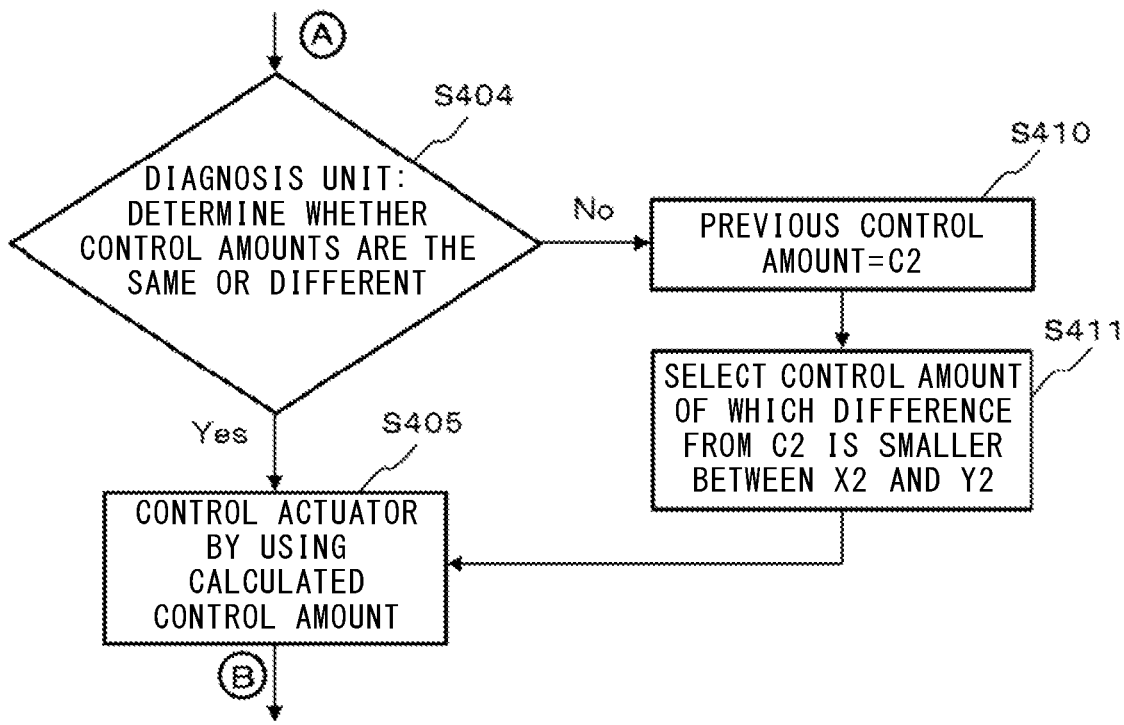
FIG. 7 is a part of a flowchart for an autonomous driving assistance system according to embodiment 4.

In the present embodiment, a measure against the case where a control amount calculated in the driving assistance device 10 and a control amount obtained in a downstream device such as the steering device 20, 200 are determined to be different from each other by the diagnosis unit, will be described with reference to the flowchart shown in FIG. 7.

In the flowchart, the steps from A to B of the flowchart shown in FIG. 2 have been replaced by steps in the present embodiment, and the steps other than the steps from A to B are the same as those of the flowchart in FIG. 2.

In the present embodiment, when a control amount X2 calculated in the driving assistance device 10 and a control amount Y2 obtained in a downstream device are compared with each other (step S404), if X2 and Y2 are the same control amount, the said control amount is used to control the actuator (step S405).

If the control amounts are different from each other, a previous control amount C2 (step S410) and a control amount of which the difference from C2 is smaller between the present control amounts X2 and Y2 are used (step S411) to control the actuator.

It is considered that use of a value that is closer to the previous control amount C2 allows reduction in the change of the behavior of the vehicle. Accordingly, a favorable autonomous driving assistance system can be obtained.

Embodiment 5

Figure 8:
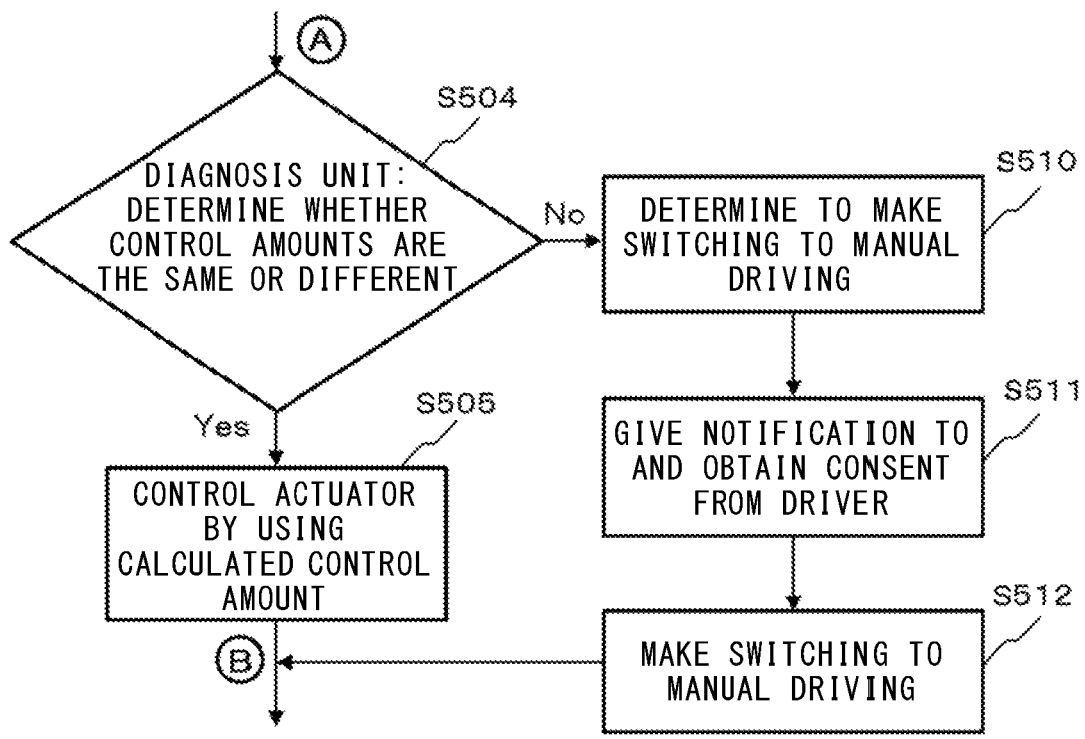
FIG. 8 is a part of a flowchart for an autonomous driving assistance system according to embodiment 5.

In the present embodiment, an operation method to safely make switching to manual driving in the case where a control amount calculated in the driving assistance device 10 and a control amount calculated in a downstream device such as the steering device 20, 200 are different from each other, will be described with reference to the flowchart shown in FIG. 8.

In the flowchart, the steps from A to B of the flowchart shown in FIG. 2 have been replaced by steps in the present embodiment, and the other steps are the same as those shown in the flowchart in FIG. 2.

The present embodiment is the same as the normal flow in that, when the control amounts obtained in the driving assistance device 10 and the downstream device are compared with each other (step S504), if the control amounts are the same control amount, the said control amount is used to control the actuator (step S505).

If the control amounts obtained in the driving assistance device 10 and the downstream device are determined to be different from each other and autonomous driving is interrupted, it may be risky to perform control such as stoppage of the engine, fuel cut, or application of the brake. In view of this, it is determined to make switching to manual driving (step S510), notification is given to the driver, and consent is obtained (step S511) before switching is made to manual driving (step S512), whereby it is possible to ensure safety at the time of switching to manual driving.

Embodiment 6

Figure 9:
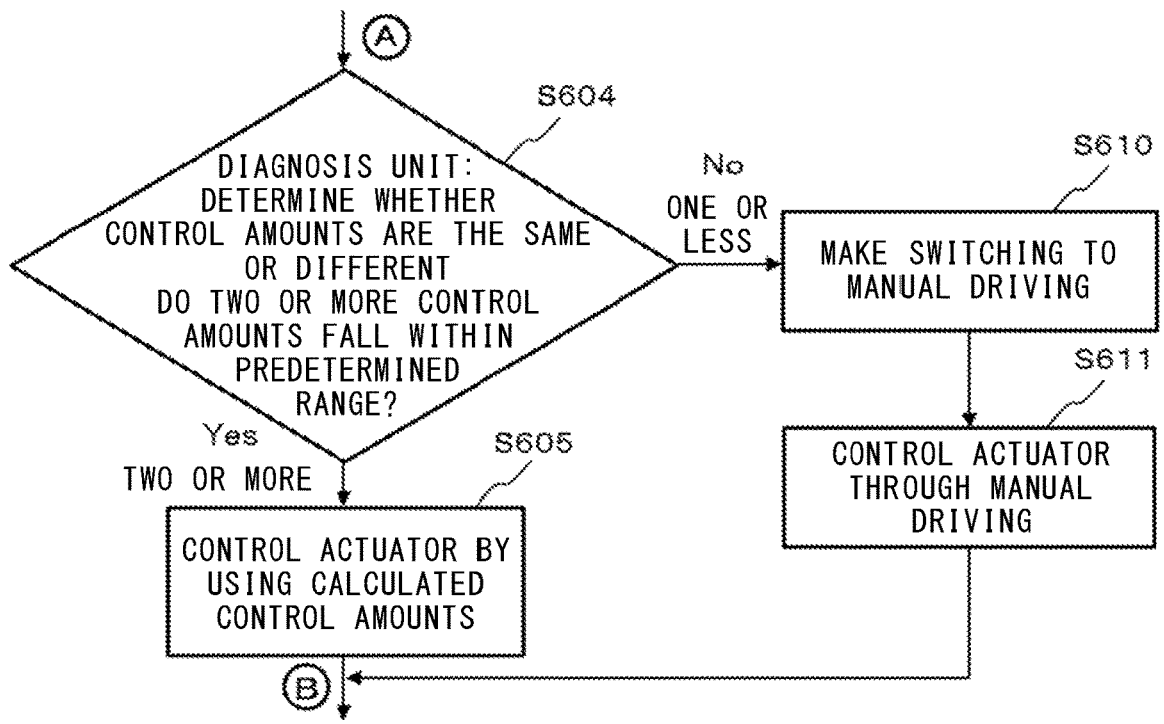
FIG. 9 is a part of a flowchart for an autonomous driving assistance system according to embodiment 6.

In the present embodiment, determination as to whether or not control amounts obtained in the driving assistance device 10 and a downstream device are different from one another, will be described with reference to the flowchart shown in FIG. 9.

In the flowchart, the steps from A to B of the flowchart shown in FIG. 2 have been replaced by steps in the present embodiment, and the other steps are the same as those shown in the flowchart in FIG. 2.

In the present embodiment, for comparison between the control amounts obtained in the driving assistance device 10 and the downstream device, a predetermined allowable range is set on the basis of a previous control amount, and determination as to appropriateness of autonomous driving is performed on the basis of whether or not two or more of the control amounts fall within the range (step S604).

If two or more of the control amounts obtained in the driving assistance device 10 and the control amounts obtained in the downstream device fall within the allowable range, these values are used to control the actuator (step S605).

If the number of control amounts within the predetermined range is one or less, for example, notification is given to the driver and switching is made to manual driving (step S610), and the actuator is controlled through manual driving (step S611).

In the present embodiment, in the case of using three control amounts, driving can be continued without interrupting the autonomous driving even if one of the control amounts is outside the allowable range. Accordingly, convenience can be ensured in addition to safety.

Embodiment 7

Figure 10:
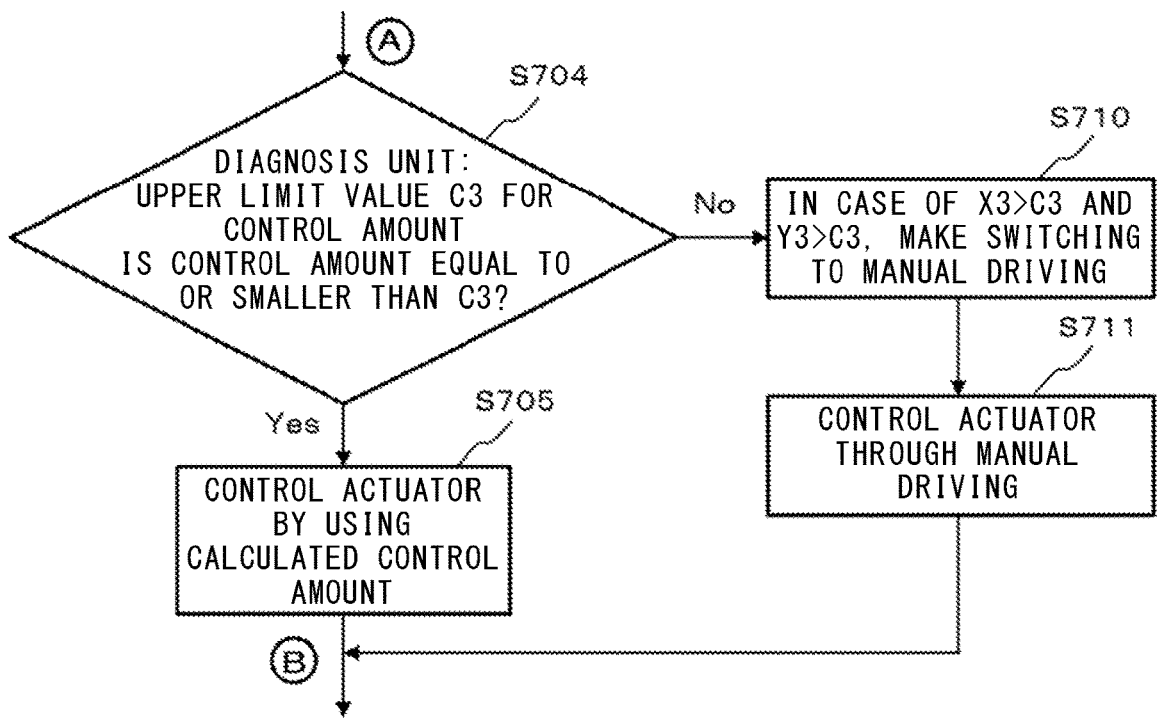
FIG. 10 is a part of a flowchart for an autonomous driving assistance system according to embodiment 7.

In the present embodiment, a measure against the case where control amounts obtained in the driving assistance device 10 and a downstream device are different from each other, will be described with reference to the flowchart shown in FIG. 10.

In the flowchart, the steps from A to B of the flowchart shown in FIG. 2 have been replaced by steps in the present embodiment, and the other steps are the same as those shown in the flowchart in FIG. 2.

On the basis of previous values of the control amounts obtained in the driving assistance device 10 and the downstream device, an upper limit value C3 for the control amounts is set (step S704). The upper limit value C3 is compared with a control amount X3 obtained in the driving assistance device 10 and a control amount Y3 obtained in the downstream device (step S704). If any of the control amounts is smaller than the upper limit value C3, the said control amount is used to control the actuator (step S705).

If each of the control amounts X3 and Y3 is larger than the upper limit value C3, switching is made to manual driving (step S710). Then, for example, notification is given to the driver, and the actuator is controlled through manual driving (step S711).

If the upper limit value is set, an abrupt and great change in the control amount can be prevented, whereby an abrupt change in the movement of the vehicle can be inhibited.

Embodiment 8

Figure 11:
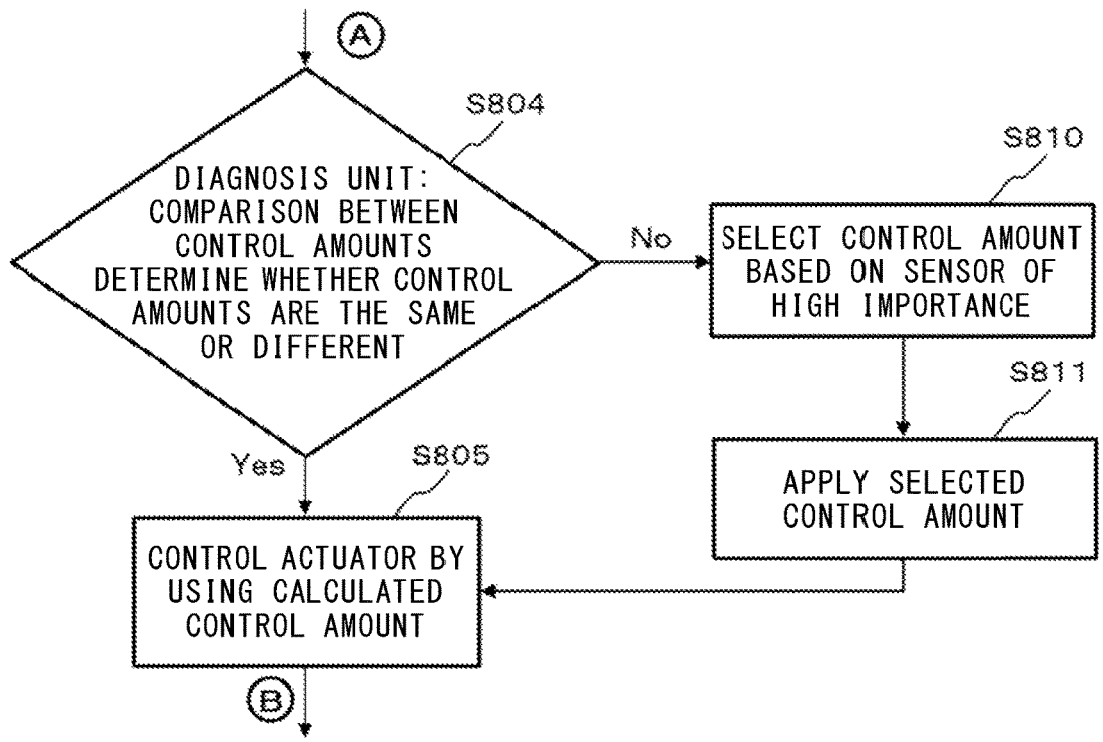
FIG. 11 is a part of a flowchart for an autonomous driving assistance system according to embodiment 8.

In the present embodiment, a measure against the case where control amounts obtained in the driving assistance device 10 and a downstream device are different from each other, will be described with reference to the flowchart shown in FIG. 11.

In the flowchart, the steps from A to B of the flowchart shown in FIG. 2 have been replaced by steps in the present embodiment, and the other steps are the same as those shown in the flowchart in FIG. 2.

In the present embodiment, the diagnosis unit compares the control amounts with each other and determines whether the control amounts are the same as or different from each other (step S804), as in embodiment 1 and the like. If the control amounts are the same value, the said value is used to control the actuator (step S805). If the control amounts are different from each other, a control amount calculated from surroundings information acquired by a sensor is selected on the basis of a predetermined order of importance of the sensors (step S810). The selected control amount is used to control the actuator (step S811).

Since a control amount based on the predetermined order is used, control can be performed without interrupting autonomous driving, whereby autonomous driving can be performed with high safety.

Embodiment 9

In the present embodiment, a selection method for a control amount in a diagnosis unit will be described with reference to the flowchart shown in FIG. 12.

In the flowchart, the steps from A to B of the flowchart shown in FIG. 2 have been replaced by steps in the present embodiment, and the other steps are the same as those shown in the flowchart in FIG. 2.

The present embodiment is the same as the other embodiments in that a diagnosis unit determines whether or not control amounts are the same as or different from each other (step S904). Meanwhile, as in the present embodiment, for example, a predetermined range divided into a plurality of levels may be specified for a control amount instead of obtaining a numerical value of the control amount, to carry out the present disclosure.

As an example, for a control amount X4 regarding acceleration/deceleration, division into the following five levels may be performed: $X4>a$ (high acceleration), $a \geq X4 > b$ (low acceleration), $b \geq X4 > c$ (maintaining the speed), $c \geq X4 > d$ (low deceleration), and $d \geq X4$ (high deceleration) (step S905).

Figure 12:
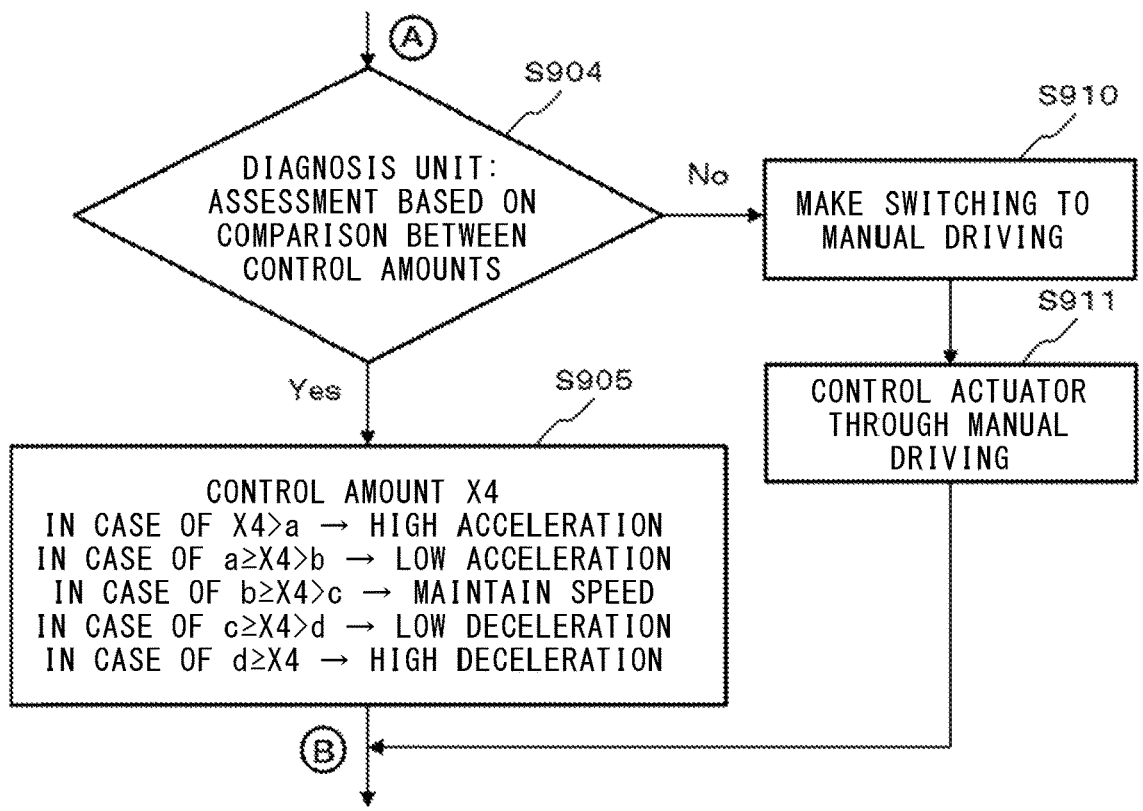
FIG. 12 is a part of a flowchart for an autonomous driving assistance system according to embodiment 9.

If the diagnosis unit determines that the control amounts are different from each other, switching is made to manual driving (step S910) and the actuator is manually controlled (step S911), in FIG. 12. However, the present disclosure is not limited thereto. For example, combination with embodiment 3 or the like may be performed. That is, combination with the method in which a small control amount considered to result in highest safety is selected may be performed.

If determination that involves specifying a range divided into a plurality of levels is performed as described above instead of obtaining a control amount as a numerical value, the amount of information to be acquired from the sensors 1 can be reduced, and load of calculation can also be suppressed.

Embodiment 10

Embodiment 10 will be described with reference to FIG. 13 and FIG. 14. The present embodiment is the same as embodiment 2 in that control amounts are parallelly calculated in the plurality of downstream devices. Meanwhile, the present embodiment is different from embodiment 2 in that the autonomous driving system is constructed without being provided with any driving assistance device.

Figure 14:
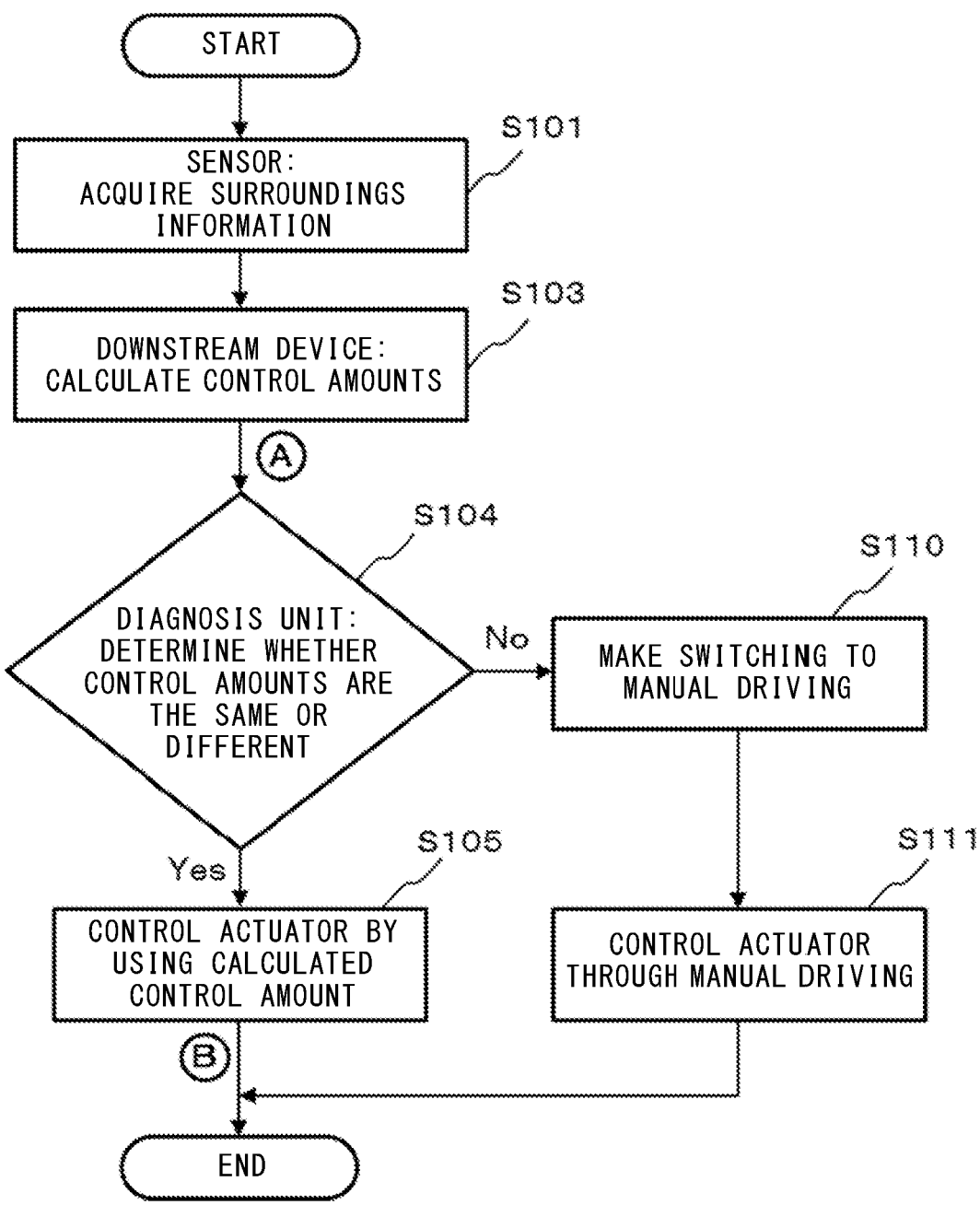
FIG. 14 is a flowchart for the autonomous driving assistance system according to embodiment 10.

FIG. 14 is a flowchart for the autonomous driving assistance system according to the present embodiment. The hardware configuration is basically the same as that in FIG. 3, and thus description thereof is omitted.

In the present embodiment, the steering route generation unit 201, the drive route generation unit 301, and the brake route generation unit 401 which generate routes can select and process the same information with the same accuracy. Alternatively, the accuracies of some of the route generation units may be reduced, or only some of the route generation units may be used, to calculate basic control amounts. As shown in FIG. 13, the simplified calculation makes it also possible to simultaneously calculate a plurality of types of routes and control amounts by using a pair of route generation units and a pair of control amount calculation units.

Timings of acquisition of various information from the sensors 1 may be different among the downstream devices, and there may be a difference in the acquired information.

In this case, it is considered that: errors are generated also in calculation results of a plurality of control amounts; and the calculation results do not take the same value. In view of this, it is effective that, in each diagnosis unit: a margin is set for a determination criterion; and control amounts that fall within the predetermined range are regarded as the same and determined to be normal.

In the present embodiment, in each downstream device, not only a route and a control amount for the own device but also a route and a control amount for another downstream device, are calculated. Accordingly, an autonomous driving assistance system having redundancy can be achieved without the need of any driving assistance device.

A configuration of each downstream device will be described using a configuration diagram that is explained in the present embodiment shown in FIG. 13.

Surroundings information is transmitted from the sensors 1 through the communication line 5 to the steering device 200, and a control amount for the steering portion 204 is calculated by the steering route generation unit 201 and the steering control amount calculation unit 202 and transmitted to the steering diagnosis unit 203.

At the same time, a control amount for the engine portion 304 is calculated by the drive route generation unit 311 and the drive control amount calculation unit 312 in the same steering device 200, and the control amount is transmitted through the communication line 5.

In the drive device 300, a control amount for the engine portion 304 is calculated by the drive route generation unit 301 and the drive control amount calculation unit 302 and transmitted to the drive diagnosis unit 303, and a control amount for the brake portion 404 is parallelly calculated by the brake route generation unit 411 and the brake control amount calculation unit 412 and transmitted through the communication line 5. Further, in the brake device 400, a control amount for the brake portion 404 is calculated by the brake route generation unit 401 and the brake control amount calculation unit 402 and transmitted to the brake diagnosis unit 403, and a control amount for the steering portion 204 is parallelly calculated by the steering route generation unit 211 and the steering control amount calculation unit 212 and transmitted through the communication line 5.

In addition to the steering control amount obtained in the steering device 200, the steering control amount calculated in the brake device 400 is transmitted through the communication line 5 to the steering diagnosis unit 203 of the steering device 200, and the two calculation results are compared with each other.

Similarly, two drive control amounts are transmitted to the drive diagnosis unit 303, and the two calculation results are compared with each other. In addition, two calculation results of brake control amounts are transmitted to the brake diagnosis unit 403, and the two calculation results are compared with each other.

As described above, in the present embodiment, each diagnosis unit performs determination on the basis of the calculation results obtained in the two downstream devices. Since these calculation results are calculated by different CPUs, more accurate determination can be performed, and false determination can be inhibited.

Determination using the calculation results obtained in the two downstream devices as in the present embodiment will be described with reference to the flowchart shown in FIG. 14. The flowchart is basically the same as the flowchart shown in FIG. 2 but is different therefrom in that the step of calculating a control amount in the driving assistance device (step S102) is not included.

Whether or not two calculation results of control amounts calculated in each downstream device are the same control amount, is determined (step S104). In a case where the two control amounts are the same control amount, the said control amount is used to control the actuator (step S105). In a case where the two control amounts are not the same control amount and both of the two control amounts are different from each other, switching is made to manual driving (step S110), and the actuator is controlled through manual driving (step S111).

In the present embodiment, accurate determination can be performed by using the plurality of downstream devices without providing any driving assistance device.

In the present embodiment, an example has been described in which: a steering control amount and a drive control amount are calculated in the steering device 200; a drive control amount and a brake control amount are calculated in the drive device 300; and a brake control amount and a steering control amount are calculated in the brake device 400. However, these combinations are just an example, and the same advantageous effects can be obtained also with different combinations for calculation. In addition, although an example in which two types of control amounts are calculated in each downstream device has been described, favorable effects can be obtained also if three types of control amounts are calculated in each downstream device.

In a case where, for example, two CPUs are mounted in each of the three downstream devices, two control amounts calculated by the two CPUs in the same downstream device can be used to perform diagnosis as to the validity of the calculation results. In order to improve redundancy, it is important to use calculation results obtained by different CPUs. Thus, it is possible to perform diagnosis by using, instead of a calculation result from another downstream device, calculation results obtained by the two CPUs in the same downstream device.

Embodiment 11

Figure 15:
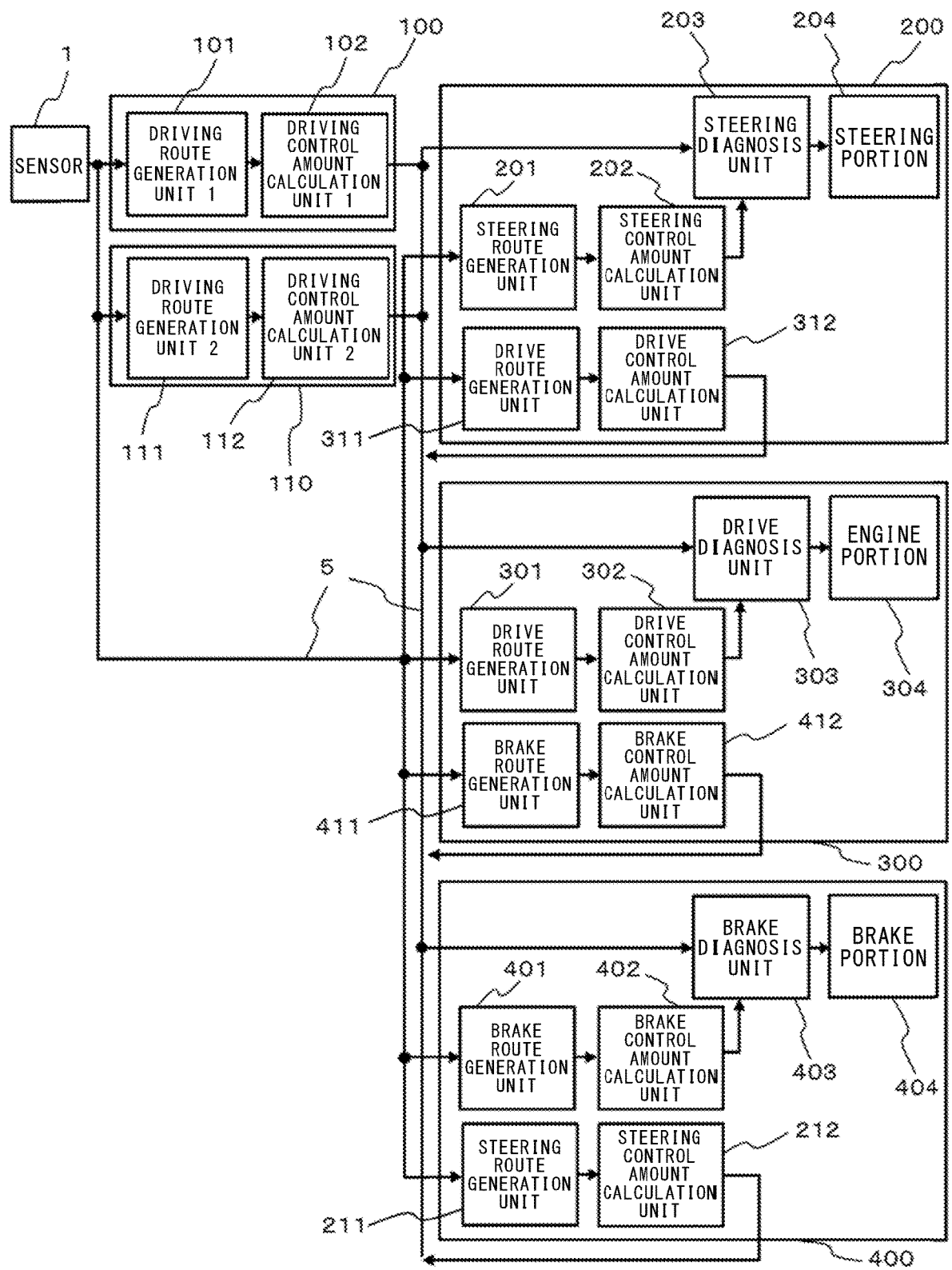
FIG. 15 is a block diagram of an autonomous driving assistance system according to embodiment 11.

Embodiment 11 will be described with reference to FIG. 15 and FIG. 16. The present embodiment is the same as embodiment 2 in that control amounts are parallelly calculated in the plurality of downstream devices. Meanwhile, the present embodiment is different from embodiment 2 in that: two or more driving assistance devices are provided; and the plurality of driving assistance devices and the plurality of downstream devices are used to calculate control amounts.

Figure 16:
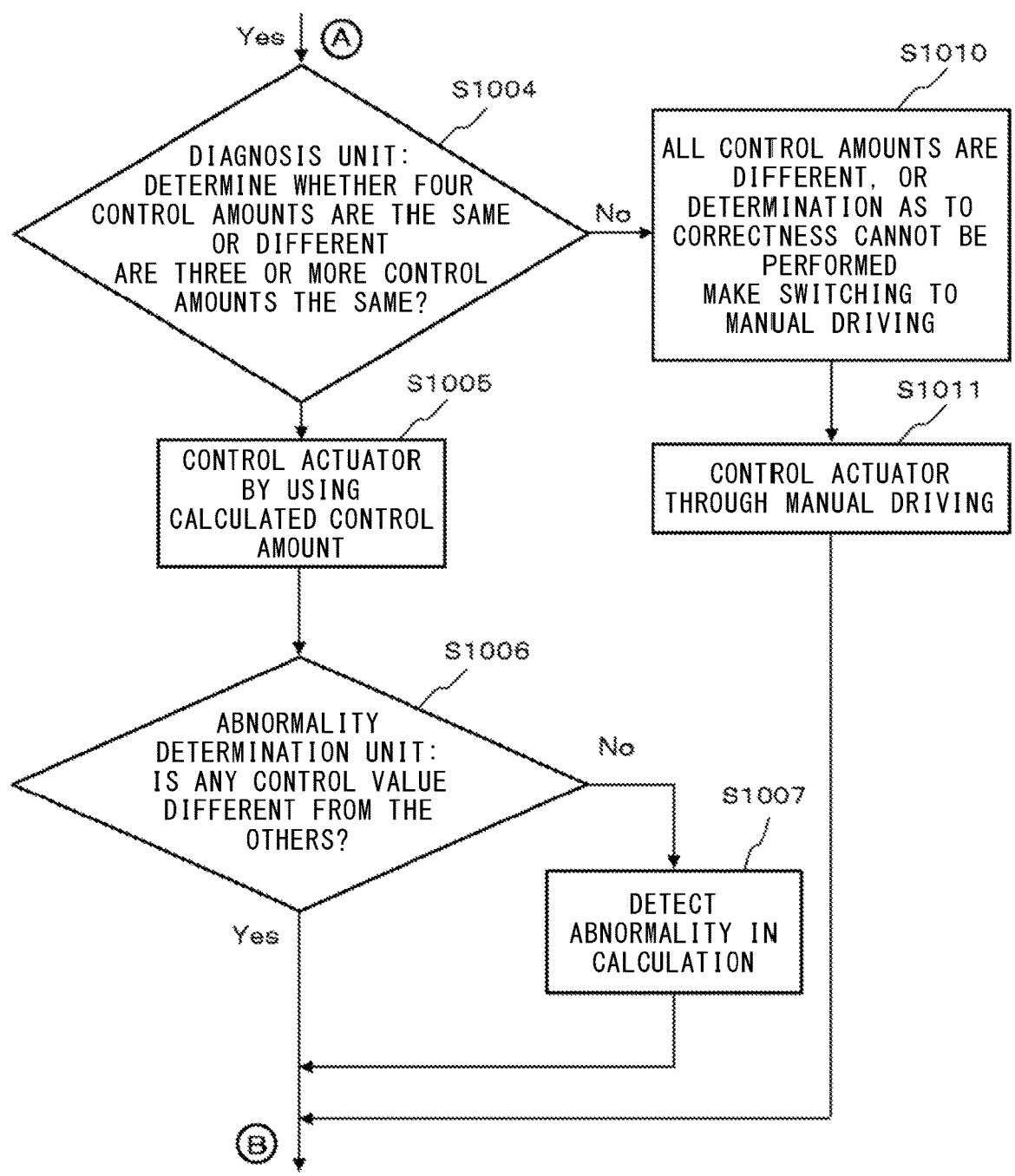
FIG. 16 is a flowchart for the autonomous driving assistance system according to embodiment 11.

FIG. 16 is a flowchart for an autonomous driving assistance system according to the present embodiment, and shows only the steps from A to B which are different from those of the flowchart for the autonomous driving assistance system according to embodiment 1 shown in FIG. 2. The hardware configuration is basically the same as that in FIG. 3, and thus description thereof is omitted.

In the present embodiment, two driving route generation units 101 and 111, the steering route generation unit 201, the drive route generation unit 301, and the brake route generation unit 401 which generate routes can select and process the same information with the same accuracy. Alternatively, the accuracies of some of the route generation units may be reduced, or only some of the route generation units may be used, to calculate basic control amounts. Further, the simplified calculation makes it also possible to simultaneously calculate a plurality of routes and control amounts by using a pair of route generation units and a pair of control amount calculation units.

Timings of acquisition of various information from the sensors 1 may be different among the downstream devices, and there may be a difference in the acquired information. In this case, it is considered that: errors are generated in calculation results of a plurality of control amounts; and the calculation results do not take the same value. In view of this, it is effective that, in each diagnosis unit: a margin is set for a determination criterion; and control amounts that fall within the predetermined range are regarded as the same and determined to be normal.

In the present embodiment, along with the two driving assistance devices, in each downstream device, not only a route and a control amount for the own device but also a route and a control amount for another downstream device are calculated. Accordingly, even if an abnormality or a fault occurs in one of the driving assistance devices, at least three calculation results can be compared with one another. Therefore, an autonomous driving assistance system having high redundancy that is equivalent to the redundancy in embodiment 2 is achieved.

A configuration of each downstream device will be described using the configuration diagram explained in the present embodiment shown in FIG. 15.

Surroundings information is transmitted from the sensors 1 through the communication line 5 to the steering device 200, and a control amount for the steering portion 204 is calculated by the steering route generation unit 201 and the steering control amount calculation unit 202 and transmitted to the steering diagnosis unit 203.

At the same time, a control amount for the engine portion 304 is calculated by the drive route generation unit 311 and the drive control amount calculation unit 312 in the same steering device 200, and the control amount is transmitted through the communication line 5.

In the drive device 300, a control amount for the engine portion 304 is calculated by the drive route generation unit 301 and the drive control amount calculation unit 302 and transmitted to the drive diagnosis unit 303, and a control amount for the brake portion 404 is parallelly calculated by the brake route generation unit 411 and the brake control amount calculation unit 412 and transmitted through the communication line 5. Further, in the brake device 400, a control amount for the brake portion 404 is calculated by the brake route generation unit 401 and the brake control amount calculation unit 402 and transmitted to the brake diagnosis unit 403, and a control amount for the steering portion 204 is parallelly calculated by the steering route generation unit 211 and the steering control amount calculation unit 212 and transmitted through the communication line 5.

In addition to the steering control amount obtained in the steering device 200, the steering control amount calculated in the brake device 400 is transmitted through the communication line 5 to the steering diagnosis unit 203 of the steering device 200. Further, calculation results from two driving control amount calculation units 102 and 112 are added. Thus, the four calculation results are compared with one another.

Similarly, two drive control amounts are further transmitted to the drive diagnosis unit 303, and the four calculation results are compared with one another. In addition, calculation results of two brake control amounts are further transmitted also to the brake diagnosis unit 403, and the four calculation results are compared with one another.

As described above, in the present embodiment, each diagnosis unit performs determination on the basis of a total of four calculation results, i.e., the calculation results from two driving assistance devices 100 and 110 and the calculation results from the two downstream devices. Since these calculation results are calculated by different CPUs, more accurate determination can be performed, and false determination can be inhibited. Further, even if one of the calculation results takes an abnormal value, determination based on the other three calculation results is performed, whereby accurate determination can be continued even at the time of a fault.

In the present embodiment, determination using four calculation results will be described with reference to the flowchart shown in FIG. 16. In the flowchart, the steps from A to B of the flowchart shown in FIG. 2 have been taken out and replaced by steps in the present embodiment. The steps other than the steps from A to B are the same as those of the flowchart in FIG. 2.

Whether or not three or more calculation results among the four calculated control amounts are the same control amount, is determined (step S1004). If three or more control amounts are the same control amount, the said control amount is used to control the actuator (step S1005). Meanwhile, if three or more control amounts do not take the same value and all of the four control amounts are different from one another, or if two of the control amounts take the same value and the other two control amounts take the same value that is different from the value taken by the two control amounts so that determination as to correctness cannot be performed, switching is made to manual driving (step S1010), and the actuator is controlled through manual driving (step S1011). Further, if three of the calculation results take the same value and the calculation result from one of the driving assistance devices is different therefrom (S1006), it is determined that an abnormality is present in the device which has calculated the different control amount (S1007).

In the present embodiment, three or more control amounts are used even if a calculation result from one of the driving assistance devices is found to be abnormal. Thus, even if an abnormality occurs, the redundancy is high, and accurate determination can be performed.

In the present embodiment, two driving assistance devices and two downstream devices are used, and thus, without increase in cost, calculation result diversification and a higher redundancy are achieved as compared to the case where only calculation results from the two driving assistance devices are compared with each other.

In the present embodiment, an example has been described in which: a steering control amount and a drive control amount are calculated in the steering device 200; a drive control amount and a brake control amount are calculated in the drive device 300; and a brake control amount and a steering control amount are calculated in the brake device 400. However, these combinations are just an example, and the same advantageous effects can be obtained also with different combinations for calculation. In addition, although an example in which two types of control amounts are calculated in each downstream device has been described, favorable effects can be obtained also if three types of control amounts are calculated in each downstream device.

In the embodiment, an example has been described in which the two driving assistance devices calculate two types of control amounts and each downstream device also calculates two types of control amounts. However, these combinations are just an example, and favorable effects can be obtained also if two or more driving assistance devices are provided.

In addition, although an example in which an abnormality occurs in calculation by the driving assistance device has been described, favorable results can be obtained in the same manner also if an abnormality occurs in calculation by any of the downstream devices.

In a case where, for example, two CPUs are mounted in each of the three downstream devices, two control amounts calculated by the two CPUs in the same downstream device can be used to perform diagnosis as to the validity of the calculation results. In order to improve redundancy, it is important to use calculation results obtained by different CPUs. Thus, it is possible to perform diagnosis by using, instead of a calculation result from another downstream device, calculation results obtained by the two CPUs in the same downstream device.

Embodiment 12

Figure 13:
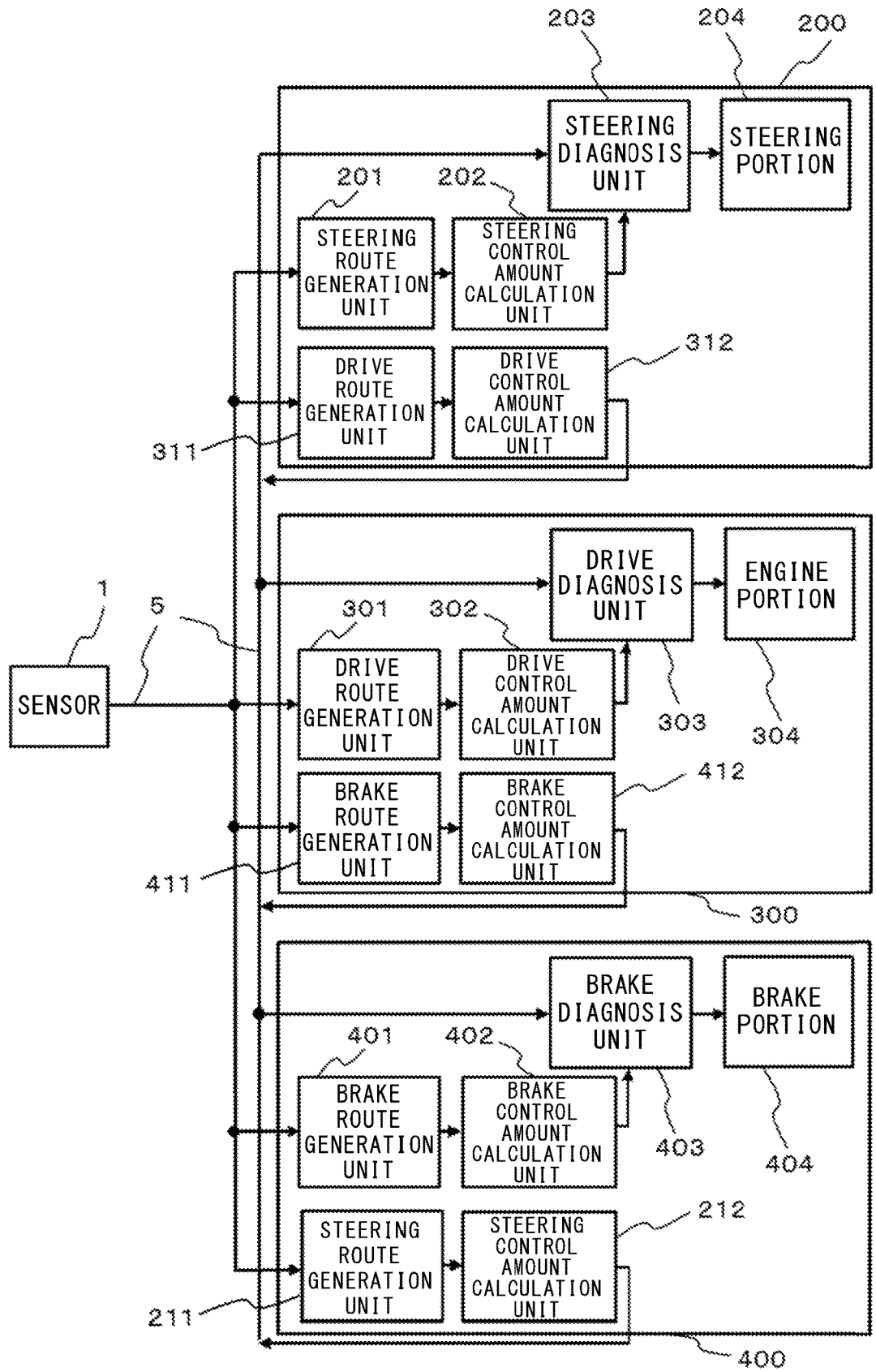
FIG. 13 is a block diagram of an autonomous driving assistance system according to embodiment 10.

In embodiment 10, an example has been described in which, in each of the downstream devices 200, 300, and 400, not only calculation of a route and a control amount for the own device but also calculation for another one of the downstream devices is performed as shown in FIG. 13.

Figure 17:
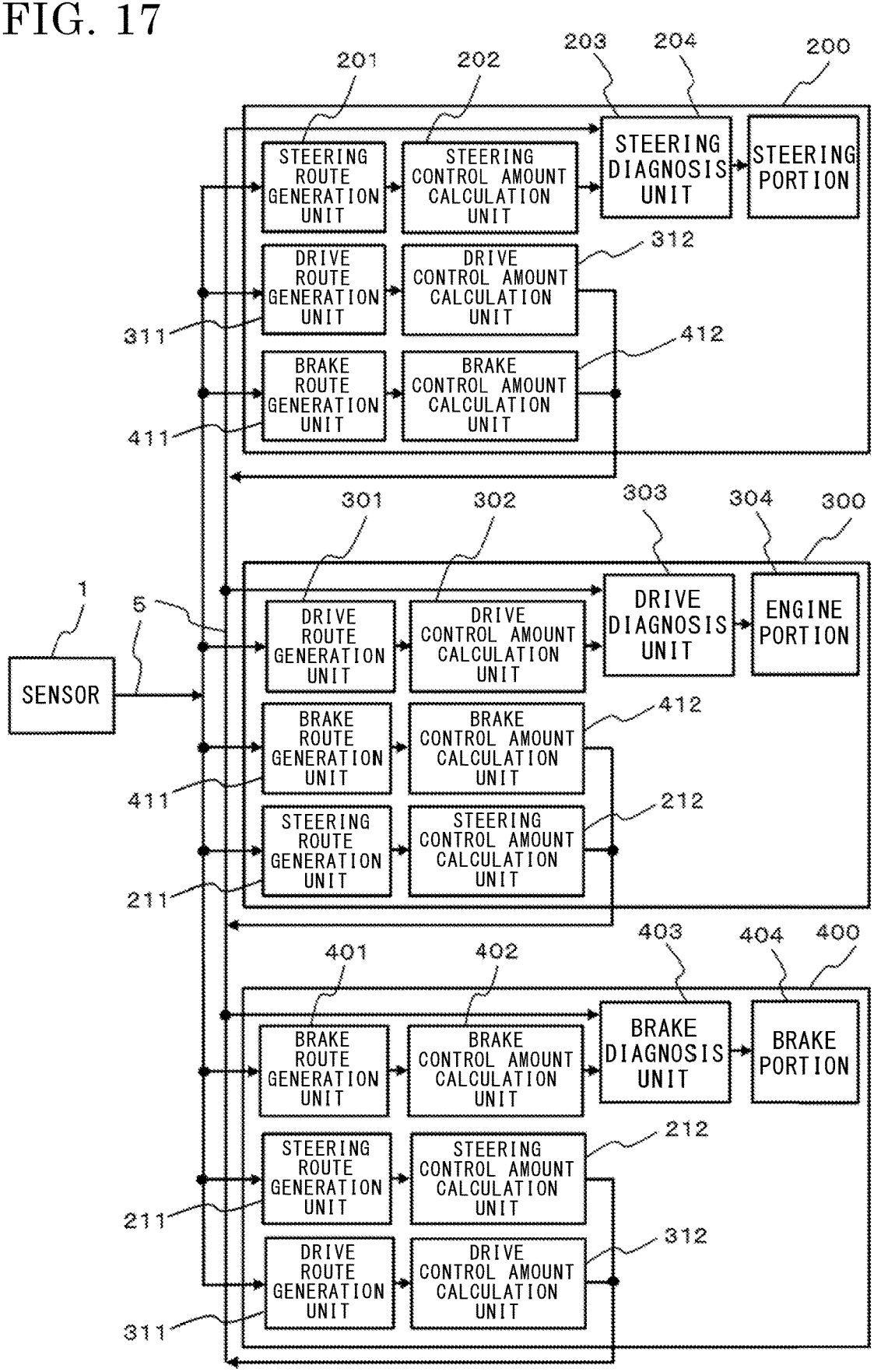
FIG. 17 is a block diagram of an autonomous driving assistance system according to embodiment 12.

In the present embodiment, a configuration in which embodiment 10 is further developed and calculation for the other two downstream devices is performed as shown in FIG. 17, will be described.

In each of the downstream devices 200, 300, and 400, not only a route and a control amount for the own device but also routes and control amounts for the other two downstream devices are calculated. Each calculation result is transmitted through the communication line 5 to the corresponding downstream device and used, by the diagnosis unit of the downstream device, for determination as to whether an abnormality has occurred in calculation.

A calculation result for the own device and calculation results for the other two downstream devices are used, and thus, even though this configuration uses only the downstream devices, the three calculation results can be compared with one another. Accordingly, a favorable autonomous driving assistance system having a higher redundancy can be formed.

In a case where, for example, two CPUs are mounted in each of the three downstream devices, two control amounts calculated by the two CPUs in the same downstream device can be used to perform diagnosis as to the validity of the calculation results. In order to improve redundancy, it is important to use calculation results obtained by different CPUs. Thus, it is possible to perform diagnosis by using, instead of a calculation result from another downstream device, calculation results obtained by the two CPUs in the same downstream device.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 sensor
5 communication line
10, 100, 110 driving assistance device
11, 101, 111 driving route generation unit
12, 102, 112 driving control amount calculation unit
13 processor
14 storage device
20, 200 steering device
21, 201, 211 steering route generation unit
22, 202, 212 steering control amount calculation unit
23, 203 steering diagnosis unit
24, 204 steering portion
30, 300 drive device
31, 301, 311 drive route generation unit
32, 302, 312 drive control amount calculation unit
33, 303 drive diagnosis unit
34, 304 engine portion
40, 400 brake device
41, 401, 411 brake route generation unit
42, 402, 412 brake control amount calculation unit
43, 403 brake diagnosis unit
44, 404 brake portion

The invention claimed is:
1. An autonomous driving assistance system comprising:
a sensor configured to acquire surroundings information;
a downstream device including an actuator configured to control a vehicle; and
a driving assistance device that calculates a first control amount for the downstream device on the basis of the surroundings information, wherein
the downstream device further includes a diagnosis processor configured to:
perform comparison between at least two control amounts that include the first control amount calculated in the driving assistance device and a second control amount calculated in the downstream device on the basis of the surroundings information; and
determine, if the at least two control amounts are equal to each other, that the at least two control amounts are normal, and determine, if the at least two control amounts are different from each other, that the at least two control amounts are abnormal.
2. An autonomous driving assistance system comprising:
a sensor configured to acquire surroundings information; and
a plurality of downstream devices including actuators configured to control a vehicle, wherein
one downstream device among the plurality of downstream devices further includes a diagnosis processor configured to:
perform comparison between at least two control amounts that include a first control amount calculated in the one downstream device on the basis of the surroundings information and a second control amount calculated in a second downstream device that is different from the one downstream device among the plurality of downstream devices on the basis of the surroundings information; and determine, if the at least two control amounts are equal to each other, that the at least two control amounts are normal, and determine, if the at least two control amounts are different from each other, that the at least two control amounts are abnormal.

3. The autonomous driving assistance system according to claim 1, wherein the downstream device includes a steering device, a drive device, and a brake device.

4. The autonomous driving assistance system according to claim 1, wherein the driving assistance device comprises a processor configured to acquire the surroundings information via the sensor and generate a travel route; and calculate the first control amount for the downstream device.

5. The autonomous driving assistance system according to claim 1, wherein the downstream device comprises a processor configured to acquire the surroundings information via the sensor and generate a travel direction; and configured to calculate the second control amount for the downstream device.

6. The autonomous driving assistance system according to claim 1, wherein comparison by the diagnosis processor is performed for, in addition to the first control amount calculated in the driving assistance device and the second control amount calculated in the downstream device, a third control amount calculated in a second downstream device that is different from the downstream device.

7. An operation method for the autonomous driving assistance system according to claim 1, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

8. The autonomous driving assistance system according to claim 2, wherein the one downstream device includes a steering device, a drive device, and a brake device.

9. The autonomous driving assistance system according to claim 2, wherein the one downstream device comprises a processor configured to acquire the surroundings information via the sensor and generate a travel direction; and calculate the first control amount for the one downstream device.

10. The autonomous driving assistance system according to claim 3, wherein the downstream device comprises a processor configured to acquire the surroundings information via the sensor and generate a travel direction; and calculate the second control amount for the downstream device.

11. The autonomous driving assistance system according to claim 4, wherein the downstream device comprises a processor configured to acquire the surroundings information via the sensor and generate a travel direction; and calculate the second control amount for the downstream device.

12. The autonomous driving assistance system according to claim 4, wherein comparison by the diagnosis processor is performed for, in addition to the first control amount calculated in the driving assistance device and the second control amount calculated in the downstream device, a third control amount calculated in a second downstream device that is different from the downstream device.

13. An operation method for the autonomous driving assistance system according to claim 2, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

14. An operation method for the autonomous driving assistance system according to claim 3, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

15. An operation method for the autonomous driving assistance system according to claim 4, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

16. An operation method for the autonomous driving assistance system according to claim 5, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

17. An operation method for the autonomous driving assistance system according to claim 6, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

18. An operation method for the autonomous driving assistance system according to claim 8, the operation method comprising determination by the diagnosis processor, wherein, if the control amounts are determined to be different from each other, a control amount that allows safety of the vehicle to be prioritized is selected from among the control amounts, and the actuator is controlled by using the control amount.

19. An operation method for the autonomous driving assistance system according to claim 9, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

20. An operation method for the autonomous driving assistance system according to claim 10, the operation method comprising determination by the diagnosis processor, wherein, if the at least two control amounts are determined to be different from each other, a control amount that allows safety of the vehicle to be prioritized is selected from among the at least two control amounts, and the actuator is controlled by using the selected control amount.

* * * * *